Aug. 11, 1942.    R. J. BRITTAIN, JR    2,292,607
JOURNAL BOX
Filed Feb. 20, 1940

INVENTOR:
RICHARD J. BRITTAIN JR.
BY Romeyn A. Spare
HIS ATTORNEY.

Patented Aug. 11, 1942

2,292,607

UNITED STATES PATENT OFFICE 2,292,607

JOURNAL BOX

Richard J. Brittain, Jr., Bloomfield, N. J., assignor to General Motors Corporation, Detroit, Mich., a corporation of Delaware Application February 20, 1940, Serial No. 319,949

9 Claims. (Cl. 308—41)

This invention relates to journal boxes. An object of the invention is to provide an improved thrust construction to cushion the longitudinal shifting movement of the shaft or axle in its bearings. Another object is to provide a thrust construction wherein a cushioning pad provides a support for the thrust block and allows the latter to self-align its thrust surface with the axle. Another object is to provide a cushioned thrust construction which is preloaded and which forms a removable unit adjustable with respect to the axle and adjustable as to its preload.

To these ends and also to improve generally upon devices of the character indicated, the invention consists in the various matters hereinafter described and claimed. In its broader aspects, the invention is not necessarily limited to the specific construction selected for illustrative purposes in the accompanying drawing in which:

Figures 1, 2, 3:
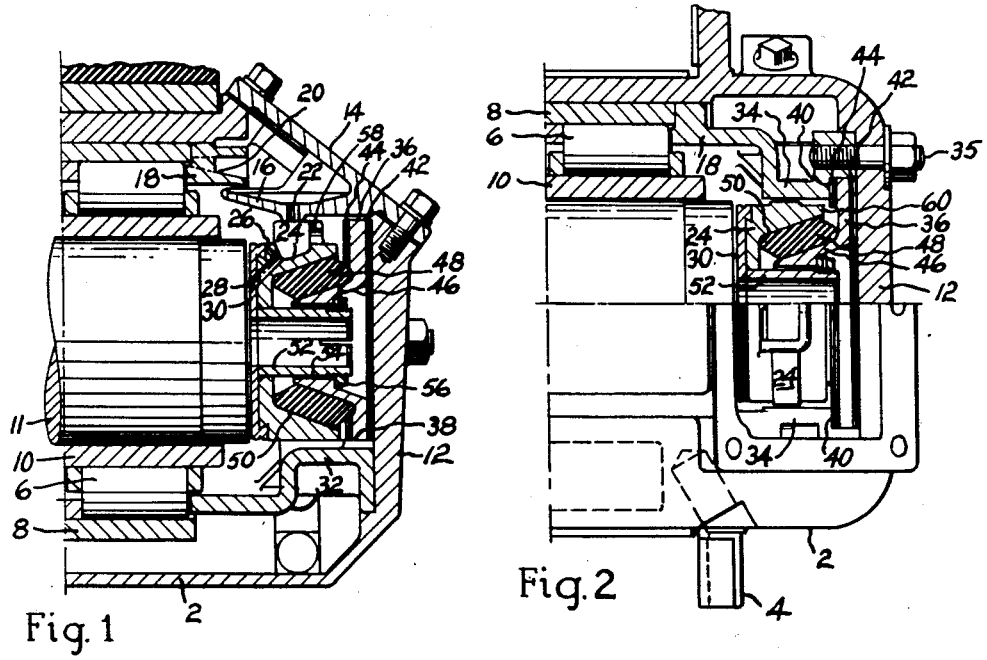
Fig. 1 is a vertical central section.
Fig. 2 is one-half a plan view and one-half a horizontal section, the lid being removed.
Fig. 3 is one half an end view and one half a vertical section.

The numeral 2 designates a journal box of which only the outer or front end is shown. It has the usual pedestal flanges 4 provided with wear plates and carries roller bearings 6 running on an outer race sleeve 8 and an inner race sleeve 10. The box has an end wall 12 and an opening closed by a lid 14. A shelf or pan 16 projects from the lid under the delivery portion of a lubricant collecting and retaining ring 18, the latter receiving oil from the bearings and discharging it through ports 20 to the pan 16. From the pan, a port 22 delivers oil to a cavity in a thrust block 24, the thrust block having an inclined port 26 to conduct the oil to a groove 28 in the thrust surface 30. The thrust surface is provided by antifriction metal such as Babbitt or bronze secured to the thrust block. The retaining ring 18 is closed at the bottom and sides by a bottom wall 32 and vertical side walls 34 but is cut away or open where the pan 16 projects to make room for the pan and to provide for vertical removal of the thrust block and connected members as a unit when the lid is removed. The retaining ring is fastened to the end wall 12 at the sides by bolts 35.

A holding plate 36 which is externally substantially square and internally round is supported at the bottom by little shelves 38 formed on the retaining ring 18 beyond vertical abutment faces 40. Spacing rings 42 which are externally square and internally round rest on the shelves and lie between the holding plate 36 and the end wall 12 while spacing plates 44 also rest on the shelves and lie between the holding plate and the abutment faces 40. Plates 44 are internally recessed or U-shape to surround certain interior parts. The holding plate has a projection 46 provided with an external tapering or conical face engaging a cushioning pad 48 which is in the form of a hollow frustrum of a cone. The pad is preferably composed of "neoprene," a substance having many of the characteristics of rubber but being more resistent to oil and heat. Confronting the conical face of the holding plate and also engaging the pad is an internal conical face 50 on the thrust block.

Secured to the thrust block as by a press fit and welding is a hollow bar or sleeve 52 which projects through the holding plate and has clearance therewith as indicated at 54. Threaded on the sleeve 52 is a nut 56 having a locking member. The nut engages an abutment face in a recess of the holding plate and can be set up to apply a predetermined initial load to the pad. The holding plate, the pad and the thrust block are thus secured together as a unit and can be vertically removed as a unit through the box opening when the lid is removed, the thrust block having a hole 58 for a lifting tool or hook. The spacing plates 42 and 44 are of a selected thickness to allow substantially no axial movement to the holding plate but the latter is loose enough to allow lifting. These spacing plates will provide for adjusting the play between the end of the axle and the thrust block. When sufficient wear occurs on the thrust surface, one of the plates 44 is removed and another spacing plate 42 of the same thickness is inserted next to its mates to take up the wear.

The holding plate is a stationary member with negligible play and it supports the pad while the pad supports the thrust block. The thrust block, however, has substantial play or clearance with respect to the bottom wall 32 and side walls 34 of the retaining ring but is held from rotation by extended corners. The thrust block is suspended clear of the surrounding box parts by virtue of the preloaded pad yet this initial load is not great and, as soon as the axle engages the thrust block with any substantial pressure, the preload is overcome and the thrust block will self-align its thrust surface with the axle should the latter be slightly cocked or tilted. The thrust block cannot move towards the axle and there will be rubbing only when the axle shifts endwise the full amount of the adjusted play. The load on the conical pad is a combined compression and shearing force and great pressure can be resisted. Compression of the pad is limited by a face 60 on the thrust block engaging the holding plate.

The sleeve 52 terminates within the box and is shorter than the combined thickness of the parts held together thereby. The thrust block and the holding plate have annular tapered projections which axially overlap or partially telescope one within the other. The thrust block and the holding plate, together with the interposed pad and securing means, form a compact unit having a total thickness less than the space between the shaft and the end wall of the box. No parts of this unit project through or beyond the end wall which is integral with the box and extends across the box parallel to the end of the shaft.

I claim:

1. In a journal box, a shaft journalled in the box, a holding plate supported within the box, a cushioning pad supported by the holding plate, a thrust block opposing the shaft and supported solely by the pad, and means for securing the thrust block, pad and holding plate together as a unit-handling structure, the securing means having less length than the combined thickness of the parts held thereby and holding the pad under compression with the thrust block spaced from the shaft.

2. In a journal box, a shaft journalled in the box, the box having an end wall extending across and spaced from the end of the shaft, a holding plate supported by the box, a cushioning pad supported by the holding plate, a thrust block opposing the shaft and supported solely by the pad, means for securing the thrust block, pad and holding plate together as a unit, said unit having a total thickness less than the space between the end wall and the shaft, the securing means holding the pad under compression with the thrust block spaced from the shaft, and the box having an opening above said space and of a size to provide for passage of said unit therethrough.

3. In a journal box, a shaft journalled in the box, a holding plate fixed with respect to the box, a thrust block opposing the shaft and having clearance with the box, the plate and the block having confronting tapered faces, a hollow cushioning pad of tapering form engaging said tapered faces, and means for preloading the pad.

4. In a journal box, a shaft journalled in the box, a holding plate fixed with respect to the box, a thrust block opposing the shaft, the plate and the block having confronting tapered faces, a cushioning pad of tapering form engaging said tapered faces and subject to combined compression and shear upon movement of the shaft against the thrust block, and means for connecting the thrust block, pad and holding plate together as a unit.

5. In a journal box, a shaft journalled in the box, the box having a solid, thrust resisting end wall extending across and spaced from the end of the shaft, a holding plate clamped with respect to the end wall and projecting away from the end wall towards the shaft, a cushioning pad supported by the holding plate, a thrust block supported solely by the pad clear of surrounding parts for universal movement in the box, the thrust block and holding plate extending partially one within the other and confined to a space less than the distance from the shaft to the end wall, and the pad engaging the outside of one extended part and the inside of the other to effect said sole support of the thrust block.

6. In a journal box, a shaft journalled in the box, the box having an end wall extending across and spaced from the end of the shaft, a holding plate having an annular extension projecting away from the end wall towards the shaft, a cushioning pad surrounding and supported by said extension of the holding plate, a thrust block having a hollow extension surrounding and supported solely by the pad, and means for holding the thrust block, pad and holding plate together with the pad under pressure against said extensions.

7. In a journal box, a shaft journalled in the box, the box having an end wall extending across and spaced from the end of the shaft, a holding plate and a thrust block interposed in the space between the shaft and the end wall and having tapered portions telescoping with one another, and a hollow cushioning ring of tapering form engaging said tapering portions and subject to combined compression and shear upon movement of the shaft against the thrust block.

8. In a journal box, a shaft journalled in the box, the box having an end wall extending across and spaced from the end of the shaft, a holding plate and a thrust block wholly contained in the space between the shaft and the end wall, the thrust block and the holding plate having similarly tapered surfaces which overlap in a direction lengthwise of the shaft, and a cushioning pad of somilarly tapered form between said tapered surfaces.

9. In a journal box, a shaft journalled in the box, the box having an end wall extending across and spaced from the end of the shaft, a holding plate and a thrust block interposed in the space between the shaft and the end wall, the holding plate and the thrust block having annular portions which telescope with one another, and a hollow cushioning ring between the holding plate and the thrust block and engaging the telescoping annular portions.

RICHARD J. BRITTAIN, Jr.